E. HOLMES.
TOWING HEAD.
APPLICATION FILED DEC. 19, 1919.

1,435,063.

Patented Nov. 7, 1922.
2 SHEETS—SHEET 1.

Witness

Inventor
Ernest Holmes
By
Attorney

E. HOLMES.
TOWING HEAD.
APPLICATION FILED DEC. 19, 1919.
1,435,063.
Patented Nov. 7, 1922.
2 SHEETS—SHEET 2.
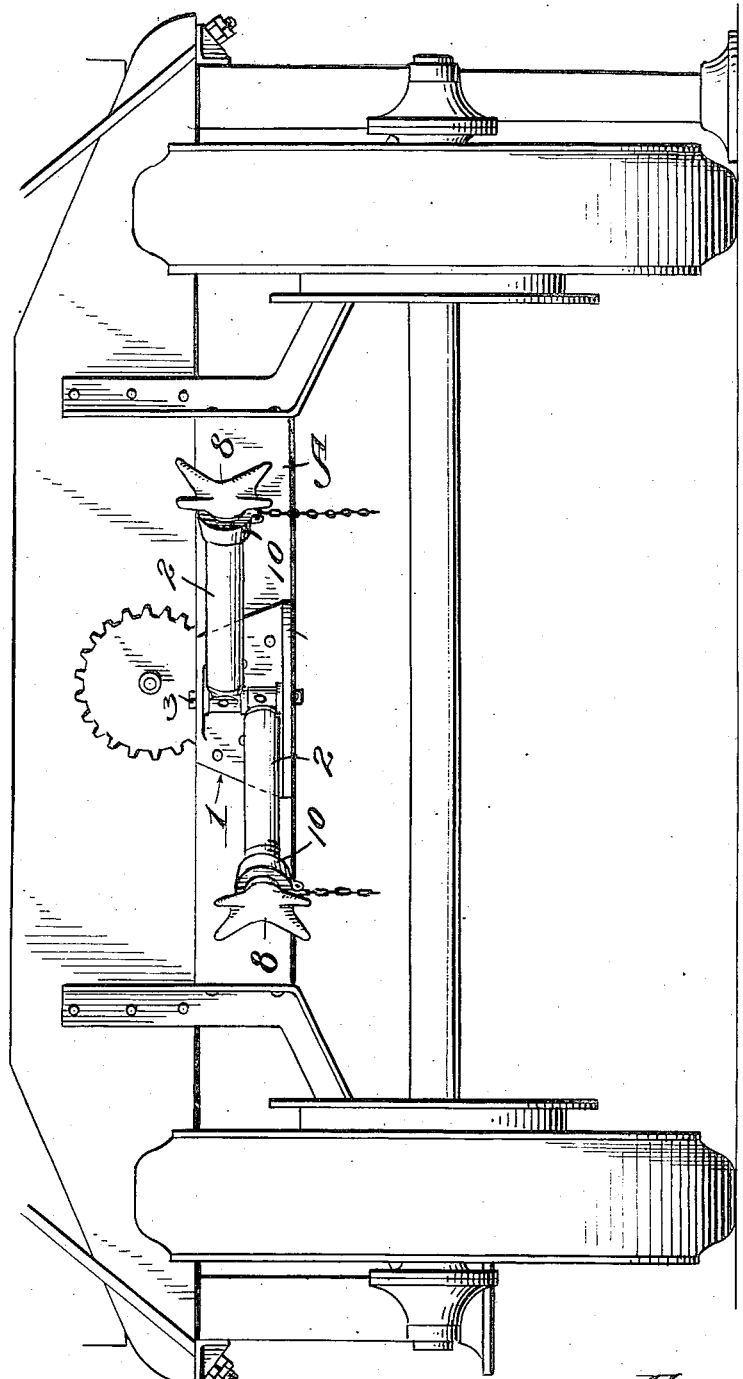
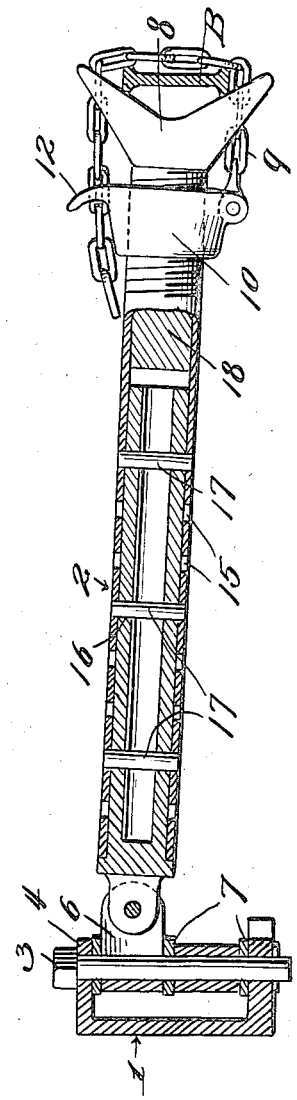
Inventor
Ernest Holmes Patented Nov. 7, 1922.

1,435,063

UNITED STATES PATENT OFFICE.

ERNEST HOLMES, OF CHATTANOOGA, TENNESSEE, ASSIGNOR TO ERNEST HOLMES COMPANY, OF CHATTANOOGA, TENNESSEE, A CORPORATION OF TENNESSEE.

TOWING HEAD.

Application filed December 19, 1919. Serial No. 345,987.

*To all whom it may concern:*

Be it known that I, ERNEST HOLMES, a citizen of the United States, residing at Chattanooga, in the county of Hamilton and State of Tennessee, have invented new and useful Improvements in Towing Heads, of which the following is a specification.

This invention relates to an improved towing head for trucks which are used in the operation of salvaging disabled automobiles and which are generally known as automobile wrecking trucks. A truck of such character and with which my improved towing head may be advantageously employed is shown in my Letters Patent of Reissue, No. 14,720, reissued September 2, 1919.

The improved towing head, as used in connection with a truck having a swinging boom or booms by which the elevated end of the vehicle in tow is suspended positively couples said vehicle to the truck and prevents its oscillation, yet permits it freely to follow or "track" the truck when the direction of movement of the latter is altered, thus serving the essential purposes set forth in the specification of my said patent.

The principal object of the present invention is to provide a towing head of the character stated which shall be simple and sturdy in its construction, which may, with facility, be coupled or uncoupled relatively to the vehicle in tow, which shall be useful in an exceedingly wide range of emergency conditions, and which shall be especially well adapted for the purposes in view.

The invention consists, generally, in certain novel features of structure and arrangement which will be set forth in detail as the description proceeds. A preferred embodiment of the invention is illustrated in the accompanying drawings, wherein:

Figure 3 is a vertical section on the line 3—3 of Figure 1.

Figure 4 is a rear elevation of a truck to which the improved towing head is fitted.

Similar characters of reference designate corresponding parts throughout the several views.

Figure 1:
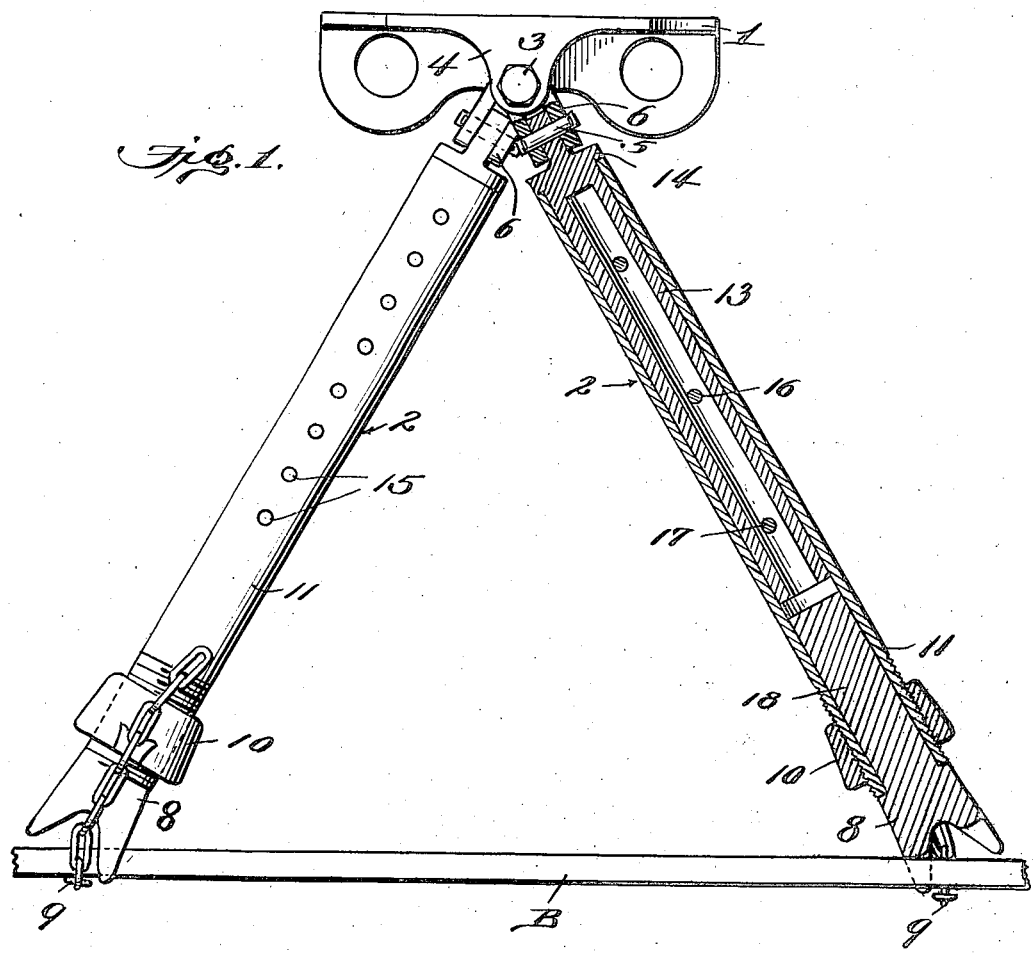
Figure 1 is a partial plan and partial horizontal section.-

For its association with the derrick truck the improved towing head includes an attachment bracket 1 of suitable form. As shown, said bracket is in the form of a flat plate having apertures for the bolts or fastenings by which it is attached to the frame A of the truck. The principal elements are a pair of rearwardly diverging coupling arms 2; these are mounted to swing vertically and horizontally, preferably in such manner that their movements may be independent of one another. In the construction shown and preferred the arms 2 are movable horizontally about a common pivot pin 3 which is secured in upper and lower lugs 4 formed with the bracket 1. Each of said arms is connected by a horizontal pivot pin 5 to a clip 6 which is mounted to swing about the pin 3. As shown, each arm has a forwardly projecting knuckle which fits between ears on the companion clip and through which the pin 5 passes; said clips are arranged, the one above, the other below, on the pin 3 and are preferably separated from one another and from the ears 4 by suitable washers or spacing rings 7. Each arm is provided at its outer end with suitable means for binding to the arm, the axle or other appropriate part of the vehicle in tow. While certain combinations of elements into which the invention may be resolved are to be understood as contemplating any means suitable for the purpose in view, it will also be understood that the means disclosed and preferred forms a part of the invention. As shown, such means essentially comprises a saddle block 8, a binding chain 9 and an element 10 for adjusting, i. e. taking up, the chain 9 relatively to the block 8, which is provided in its end with a transverse recess to receive the axle B of the towed vehicle. The element 10, as shown, is formed as a nut and is mounted upon the threaded portion of a rotatable sleeve 11. By turning the sleeve 11 the nut 10 may be moved in either direction lengthwise of the arm 2 and as thus moved it will take up or let out the chain 9 whose terminals are secured to said nut at diametrically opposite points. One terminal of the chain 9 may be permanently secured to the nut 10; the other terminal is detachably secured. Thus, said nut may be provided with a pair of horns 12 between which any appropriate link of the chain 9 may be engaged.

The arms 2 are preferably adjustable as to their length; and in the embodiment disclosed the sleeve 11 is a component and adjustable element of each arm and is fitted over a companion element 13. The latter is directly connected to the clip 6 and is formed at its inner end with an annular shoulder 14 against which the sleeve 11 bears when in its innermost position of adjustment. The elements 11 and 13 may be adjusted relatively to one another in any suitable manner; the means shown, which is well known for the adjustment and mutual connection of parts, embodies a plurality of closely associated apertures 15 formed in the element 11, one or more apertures 16 formed in the element 13, and cross-pins 17 for engagement in the apertures 16 and in those of the apertures 15 which may be alined with the apertures 16. It will be obvious that by such means each arm 2 may be lengthened or shortened, as desired, it being, of course, understood that in most instances said arms will be of the same length. Each arm 2 is further characterized by a terminal socket to receive a gudgeon 18 projecting axially from the block 8 and said socket is afforded by that portion of the element 11 which, in any case, projects beyond the companion element 13.

Figure 2:
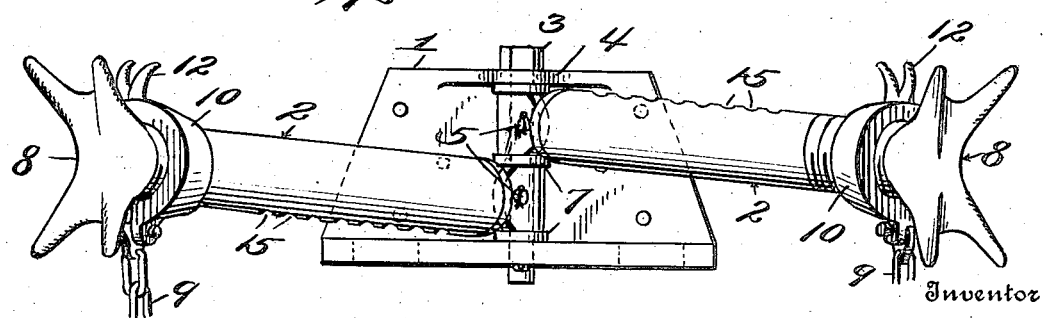
Figure 2 is an elevation.

In use the arms 2 are positioned symmetrically with relation to the center of the truck and their ends are connected to the appropriate part or parts, for example, the axle B of the vehicle in tow. Figure 1 shows said axle as centered within the seats afforded by the blocks 8 and as bound to said blocks by the chains 9. Before the axle is thus arranged in the blocks 8 the nuts 10 are positioned whereby the loop of the chain encircling the axle will have considerable slack. When the ends of the chain have been secured in the horns 12 the sleeves 11 are turned in a direction to move the nuts along the arms 2 in a direction away from the axle. Such adjustment of the nuts will, of course, take up the slack of the chains 9 and cause them to hold the axle B in the blocks 8 with the utmost security. When the axle is thus associated with the arms 2 the latter will swing as a unit about the pin 3 but will prevent any independent oscillation of the vehicle in tow. It will, of course, be apparent that by virtue of the horizontal pivot connections 5 the arms 2 are adaptable to the required elevation of the suspended end of the vehicle in tow. It will also be apparent that by virtue of the gudgeons 18 the blocks 8 may take any angular adjustment which may be required for the secure attachment of the end of the vehicle in tow. Thus, as shown, the arm at the left (Figure 2 being considered) projects upward and the arm at the right projects downward and the blocks 8 are adjusted about their axial centers to positions in which the recesses in their ends are in exact or substantial mutual alinement. When the vehicle in tow is to be uncoupled, the sleeve 11 is turned to feed the nuts 10 in the forward direction of the arms until there is sufficient slack in the chains 9 to permit of the ready disengagement of the free ends of said chains from the horns 12.

Having fully described my invention I claim:—

1. In a towing head for vehicles, in combination, a pair of separately pivoted adjacent, rearwardly diverging arms adjustable as to length, supporting means on one of the vehicles to which said arms are pivoted for vertical and horizontal movement, a linked flexible member at the free end of each arm adapted to be connected to the other vehicle, and means for taking up the slack of said flexible member.

2. In a towing head, in combination, a pair of adjacent, substantially rigid arms, supporting means to which said arms are pivoted for vertical movement the opposite ends of said arms being free and detachable; binding means at the free end of each arm and pivotally adjustable about the axis thereof.

3. In a towing head for vehicles, the combination with a supporting bracket on one of the vehicles, of a pair of adjacent arms pivotally connected at one end to said bracket for vertical and horizontal swinging movements, each of said arms having at the other end an axially disposed socket, and means rotatably mounted in said socket adapted to be connected to the other vehicle, whereby said means may have universal movement relative to the bracket.

4. In a towing head, in combination, an arm comprising a pair of elements relatively adjustable in the lengthwise direction, one element having a terminal socket portion constantly projecting beyond the other, one end of said arm being free and binding means at the free end of said arm, said means having a gudgeon rotatably fitted in said socket portion and devices for rendering said binding means taut.

5. In a towing head, in combination, an arm comprising a rotatable element and a binding means including an element pivotally connected to said arm for relative movement about its axial center and an element adjustable lengthwise of said arm and operated in such adjustment by the turning of said rotatable element.

6. In a towing head, in combination, a supporting bracket, a pair of arms extending divergingly from said bracket, horizontal and vertical pivotal connections between said bracket and each arm and binding means at the end of each arm and pivotally adjustable about the axis thereof.

7. In a towing head for vehicles, the combination of an adjustable coupling arm pivotally attached at one end to the towing vehicle and having binding means at the other end, said means comprising a saddle block rotatably mounted in said arm, a binding chain adapted to connect said block to a part of the vehicle to be towed, and an element adjustable lengthwise of said arm and to which the terminals of said chain are connected, said element having a pair of companion horns between which a link at one terminal of said chain may be secured.

8. In a towing head, the combination with a pair of independently pivoted coupling arms having free ends, of binding means at the free end of each arm, for engaging a portion of the towed vehicle, said means including a saddle block having a transverse recess and mounted for rotation about the axis of the corresponding arm.

9. In a towing head, the combination with a pair of independently coupling arms having free ends and each including a tubular rotatable element, of binding means at the free end of said element, each means including a saddle block having a transverse recess and provided with a gudgeon rotatably fitted in said element, a binding chain co-operating with said block, and a nut for which said element is externally threaded and to which the terminals of said chain are connected.

In testimony whereof I have hereunto set my hand in presence of two subscribing witnesses.

ERNEST HOLMES.

Witnesses:
JOHN S. FLETCHER,
S. BARTOW STRANG.